United States Patent [19] | [11] 4,181,509
Honacker et al. | [45] Jan. 1, 1980

[54] FLOW PRECONDITIONER FOR ELECTROSTATIC PRECIPITATOR

[75] Inventors: Horst Honacker, Paradise Valley; Romuald J. Drlik, Phoenix, both of Ariz.

[73] Assignee: Envirotech Corporation, Menlo Park, Calif.

[21] Appl. No.: 856,296

[22] Filed: Dec. 1, 1977

Related U.S. Application Data

[63] Continuation-in-part of Ser. No. 670,462, Mar. 25, 1976, abandoned, which is a continuation-in-part of Ser. No. 588,223, Jun. 19, 1975, abandoned.

[51] Int. Cl.[2] .......... B03C 3/01; B03C 3/36; B01D 50/00

[52] U.S. Cl. .......... 55/106; 55/122; 55/126; 55/127; 55/129; 55/133; 55/134; 55/154; 55/210; 55/238; 55/257 R; 55/270; 55/274; 55/318; 55/426; 55/428; 55/DIG. 38; 138/37; 138/39

[58] Field of Search .......... 55/106, 122, 126, 127, 55/129, 133, 134, 154, 210, 238, 257 R, 270, 274, 318, 426, 428, 440, 459 R, 459 B, 465, 466, DIG. 38; 138/37, 39; 73/205 L, 212

[56] References Cited

U.S. PATENT DOCUMENTS

| | | | |
|---|---|---|---|
| 1,288,126 | 12/1918 | Muller | 55/414 |
| 1,475,639 | 11/1923 | Lyle et al. | 55/440 X |
| 1,940,198 | 12/1933 | Wagner | 55/106 |
| 1,941,287 | 12/1933 | Weiskopf | 55/133 X |
| 2,222,930 | 11/1940 | Arnold | 55/416 X |
| 2,463,382 | 3/1949 | Hobbs | 55/440 X |
| 2,667,185 | 1/1954 | Beavers | 55/128 X |
| 3,063,219 | 11/1962 | Copcutt | 55/128 X |
| 3,075,559 | 1/1963 | Sharp et al. | 138/37 |
| 3,255,963 | 6/1966 | Gorchev et al. | 138/46 X |
| 3,315,444 | 4/1967 | De Seversky | 55/119 X |
| 3,315,445 | 4/1967 | De Seversky | 55/122 |
| 3,511,030 | 5/1970 | Hall et al. | 55/129 |
| 3,731,461 | 5/1973 | Hamon | 55/257 P UX |
| 3,733,785 | 5/1973 | Gallaer | 55/129 |
| 3,733,900 | 5/1973 | De Baun | 138/37 X |
| 3,742,681 | 7/1973 | De Seversky | 55/119 |
| 3,751,982 | 8/1973 | Lambert | 73/212 |
| 3,757,498 | 9/1973 | Hurlbut, Sr. et al. | 55/440 |
| 3,838,598 | 10/1974 | Tompkins | 73/205 L |
| 3,856,476 | 12/1974 | De Seversky | 55/128 X |

FOREIGN PATENT DOCUMENTS

| | | | |
|---|---|---|---|
| 120573 | 1/1919 | United Kingdom | 55/133 |

*Primary Examiner*—Frank W. Lutter
*Assistant Examiner*—Kathleen J. Prunner

[57] ABSTRACT

A flow preconditioner for an electrostatic precipitator which removes particulate matter from a stream of polluted gas immediately after it passes through a tangential inlet at the lower end of a vertical cylindrical housing and straightens and divides the stream into laminations parallel to the axis of the housing. It comprises an annular ledge or choke ring extending inwardly from said housing above the inlet and an assembly of vanes above said ledge extending radially from the axis of the housing and angularly spaced apart. Each of said vanes has a flow receiving edge directed toward said inlet, a curved portion extending upwardly and away from said inlet, and a flat portion extending upwardly from said curved portion in a plane parallel to the housing axis. The curved portion of each vane defines a trough having a camber which gradually decreases along its span from the outer end of the vane towards the axis of the housing, together with means to vary the centrifugal flow distribution relative to the housing to render the preconditioner adjustable for various flow capacities.

10 Claims, 13 Drawing Figures

FIG.4.
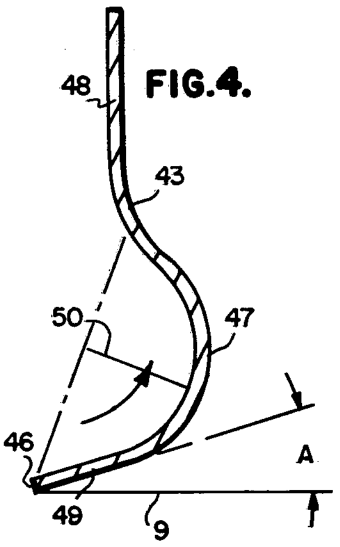
FIG.5.
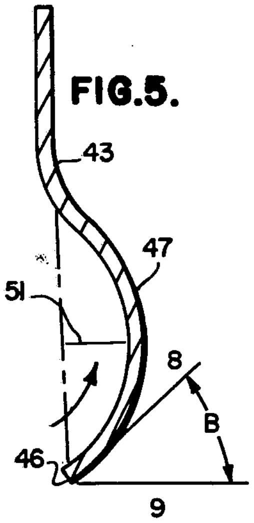
FIG.6.
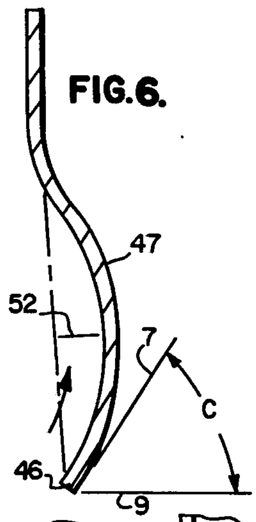
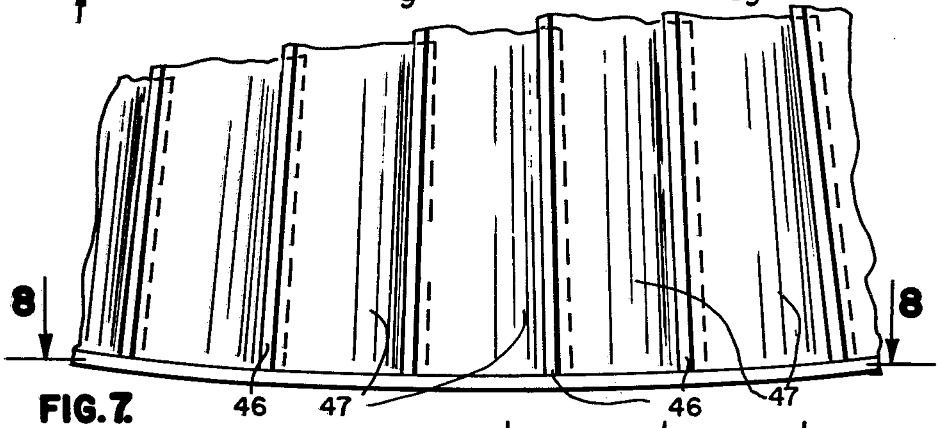
FIG.7.
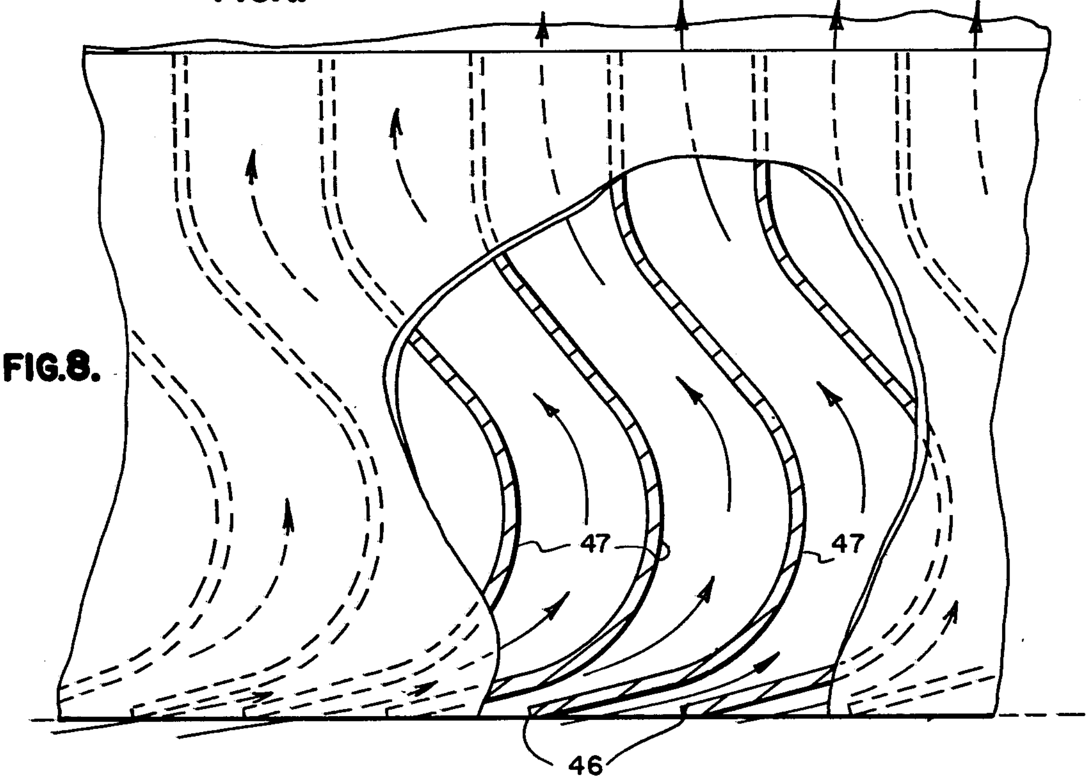
FIG.8.

FLOW PRECONDITIONER FOR ELECTROSTATIC PRECIPITATOR

This application is a continuation-in-part of the co-pending application of Horst Honacker and Romuald J. Drlik, Ser. No. 670,462, filed Mar. 25, 1976, and entitled "Pneumatic Fluid Preconditioner and Flow Straightening Means for Electrostatic Precipitators," now abandoned and which application is, in turn, a continuation-in-part of the application of Horst Honacker and Romuald Drlik, Ser. No. 588,233, filed June 19, 1975, now abandoned, for "Pneumatic Fluid Preconditioner and Flow Straightening Means for Electrostatic Precipitators."

The present invention relates to flow preconditioners for electrostatic precipitators and is concerned primarily with a preconditioner which initially removes particulate matter from a stream of polluted gas immediately after it enters a cylindrical housing and then divides and straightens the stream into laminations parallel to the axis of the housing.

BACKGROUND OF THE INVENTION

It has been a problem to attain fluid preconditioners which provide flow straightening functions and circular-in-cross section electrostatic precipitators with tangential inlets while maintaining relatively low pressure drop and uniform flow conditions through the entire cross-sectional area of the fluid flow preconditioner including straightening elements as well as the electrodes of an electrostatic precipitator.

Further, it has been a problem to attain the foregoing advantages while providing for the efficient removal of particulate material from pneumatic fluids as well as to control the removal of mist therefrom to a desired degree. Additionally, it has been a problem to provide fluid preconditioners which provide flow straightening functions in electrostatic precipitators which are circular in horizontal cross-section and wherein vortex effects may occur relative to said circular housing having tangential inlets. Furthermore, it has heretofore been desirable to provide a fluid preconditioner including flow straightening means for electrostatic precipitators which are circular in horizontal cross-section and which is relatively compact in proportionate diameter and flow capacity of the electrostatic precipitator housing and relative to the overall cross-sectional flow area therein.

It is believed that the prior art which comes closest to the instant electrostatic precipitator is disclosed in U.S. Pat. Nos. 3,315,444 and 3,315,445, with the latter being the more pertinent. The apparatus of this patent is intended to be installed on the roof of a building over a furnace or incinerator and hence is logically confined to small installations as compared to a large apparatus which is intended for industrial use such as smelters, mills, and the like. In the case of small installations, it is important that the polluted gas stream have a laminar vertical flow after it is converted from a vortex, which is the form it takes after it leaves a tangential inlet, but the importance of this is not as great as in an industrial installation.

Thus, the patentee of U.S. Pat. No. 3,315,445 provides a vane assembly through which the contaminated gases pass which imparts a zig-zag motion to the stream. This is a condition which is extremely desirable to be avoided for industrial use..

The patentee of U.S. Pat. No. 3,315,444 also tends that his apparatus be installed on the roof of a building and hence is obviously a small device as compared to an apparatus intended for industrial use. Here again, he recognizes the importance of providing for a straight laminar flow of the gas stream but the mechanism he discloses actually impairs such straight laminar flow. Moreover, he suggests that vanes may be curved but discloses no particular curve structure.

OBJECTS OF THE INVENTION

With the foregoing conditions in mind, the present invention has in view the following objectives:

1. To provide a flow preconditioner for an electrostatic precipitator which includes a cylindrical housing having a tangential inlet for contaminated gases at its lower end, means on said housing for removing particulate matter from the gases immediately above said inlet, and an assembly of angularly spaced radially extending vanes above the particulate matter removing means for converting the vortex of gases created by the tangential inlet into a straight laminar flow parallel to the axis of the housing;

2. To provide, in a flow preconditioner of the type noted, particulate matter removing means in the form of an angular ledge or choke ring mounted on the inner surface of the housing and extending radially inwardly therefrom;

3. To provide, in a flow preconditioner of the character aforesaid, spray heads in said inlet for spraying water onto the incoming polluted gases;

4. To provide, in a flow preconditioner of the kind described, an array of vanes each of which has a flow receiving edge directed toward said inlet, a curved portion extending upwardly and away from said inlet, and a flat portion extending upwardly from said curved portion in a direction parallel to the axis of the housing, with said curved portion defining a trough the camber of which gradually and continuously decreases along its span from its outer end towards the housing axis;

5. To provide, in a flow preconditioner of the type noted, an assembly of two arrays of vanes separated by a circular partition which is coaxial with the housing axis, with the innermost of said two arrays having a smaller number of vanes than the outermost array;

6. To provide, in a flow preconditioner of the character aforesaid, an annular ledge having a lower wall that is normal to the housing wall and an upper frustoconical wall extending upwardly and radially outwardly from the inner edge of said lower wall, together with a truncated conical spoiler ring mounted in spaced relation to said frustoconical wall to provide an annular slot between said frustoconical and truncated walls;

7. To provide, in a flow preconditioner of the kind described, means for adjusting the spoiler ring relative to said ledge to vary the size of the slot between the two;

8. To provide, in a flow preconditioner of the type noted, a sensor for determining the rate of flow of the stream of polluted gas through the array of vanes; and 9. To provide, in a flow preconditioner of the character aforesaid, a transducer which is operatively connected to said sensor and a motor which is controlled by the transducer to operate said spoiler ring adjusting means.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by providing a cylindrical housing having a central axis and a tubular column coaxial with the housing. This housing presents an inner cylindrical surface. The housing is formed at its lower end with a tangential inlet for contaminated gases whereby the gas stream makes a substantially complete orbit about the inner surface of the housing to create a vortex of gases. This inlet is provided with a plurality of spray heads for spraying water onto the stream of polluted gas.

Spaced above the lower end of the housing and extending radially inwardly from the inner surface thereof is a choke ring defined by a lower flat wall that is normal to the housing axis and an upper frustoconical wall that extends upwardly and radially outwardly from the inner edge of the lower wall.

The cylindrical housing has a bottom wall of inverted frustoconical shape which has its largest periphery of uniform radius at the edge of a portion of said tangential inlet and housing wall and its smallest periphery forming an opening which communicates with a liquid outlet at the lower end of said central column. Thus polluted gas is sprayed with water as it enters the inlet and passes about the lower end of the housing immediately above the bottom wall thereof. Due to centrifugal force, particulate matter is collected by the water and moved radially outwardly against the inner surface of the housing. The pressure on the gas stream moves the stream together with the particulate matter upwardly so that the particulate matter engages the lower wall of the ledge which functions as an abutment and causes the particulate matter and water to fall downwardly onto the bottom wall of the housing and pass outwardly through the inlet at the bottom of the central column to a suitable point of disposal.

Immediately or a slight distance above the ledge is a vane assembly. While it is entirely possible and practical in some installations to include only a single array of angularly spaced radially extending vanes, in the preferred embodiment illustrated in the drawings there are two arrays of vanes separated by an annular partition that is coaxial with the housing axis which provides an inner array and an outer array of vanes. There are a smaller number of vanes in the inner array than in the outer array.

Each vane has a flow receiving edge that is directed towards the gas inlet. Extending upwardly and away from the flow receiving edge of each vane is a curved portion, and extending upwardly from this curved portion is a flat portion that is parallel to the axis of the housing. This curved portion of each vane defines a trough or groove which has a camber which gradually and continuously decreases along the span of the trough from the outer end of the vane radially inwardly towards the central column.

Carried by the cylindrical housing above the vane assembly is a group of electrodes comprising a plurality of cylindrical collector electrodes which are equi-radially spaced apart between said central tubular column and the inner surface of the housing and a plurality of cylindrical discharge electrodes each of which is interposed between a pair of adjacent collector electrodes.

Supported by the annular ledge is a truncated conical spoiler ring, a portion of which is spaced from the upper frustoconical wall of the ledge to provide an annular slot through which polluted gases flow. This slot, being conical, directs the gases to outer regions of the lower end of the group of electrodes.

Mechanism is provided for adjusting the spoiler ring relative to the ledge to vary the effective depth or width of the slot. This adjusting mechanism may be manually operable or it may be automatically controlled by sensors in the form of pitot tubes above the vane assembly and operatively connected to a transducer which controls a motor that in turn operates the spoiler ring adjusting mechanism.

For a full and more complete understanding of the invention, reference may be had to the following description and accompanying drawings, wherein:

FIG. 4 is a detail section taken on an enlarged scale through a portion of a vane adjacent to its outer end as represented by the line 4—4 of FIG. 1 and is somewhat diagrammatic in that it depicts the angle of the flow receiving edge portion of a vane with respect to an imaginary horizontal plane;

FIG. 5 is another detail sectional view taken on an enlarged scale similar to FIG. 4 but is taken on the plane of the line 5—5 of FIG. 1;

FIG. 6 is another detail sectional view taken on an enlarged scale similar to FIGS. 4 and 5;

FIG. 7 is another detail view on an enlarged scale taken on a horizontal plane and about on the plane of the line 7—7 of FIG. 1;

FIG. 8 is still another detail taken on an enlarged scale and about on the plane of the line 8—8 of FIG. 7 with a portion of the housing broken away to illustrate the relation of the vanes in the vane assembly;

DESCRIPTION OF A PREFERRED EMBODIMENT

It is believed that a specific embodiment of the instant flow preconditioner can best be described by first outlining the environmental structure in which the preconditioner is installed and which in itself it not a part of the present invention; then the lower end of the housing including the tangential inlet, including associated mechanism; then the vane assembly; and finally the modifications.

The Environmental Structure

Figure 1:
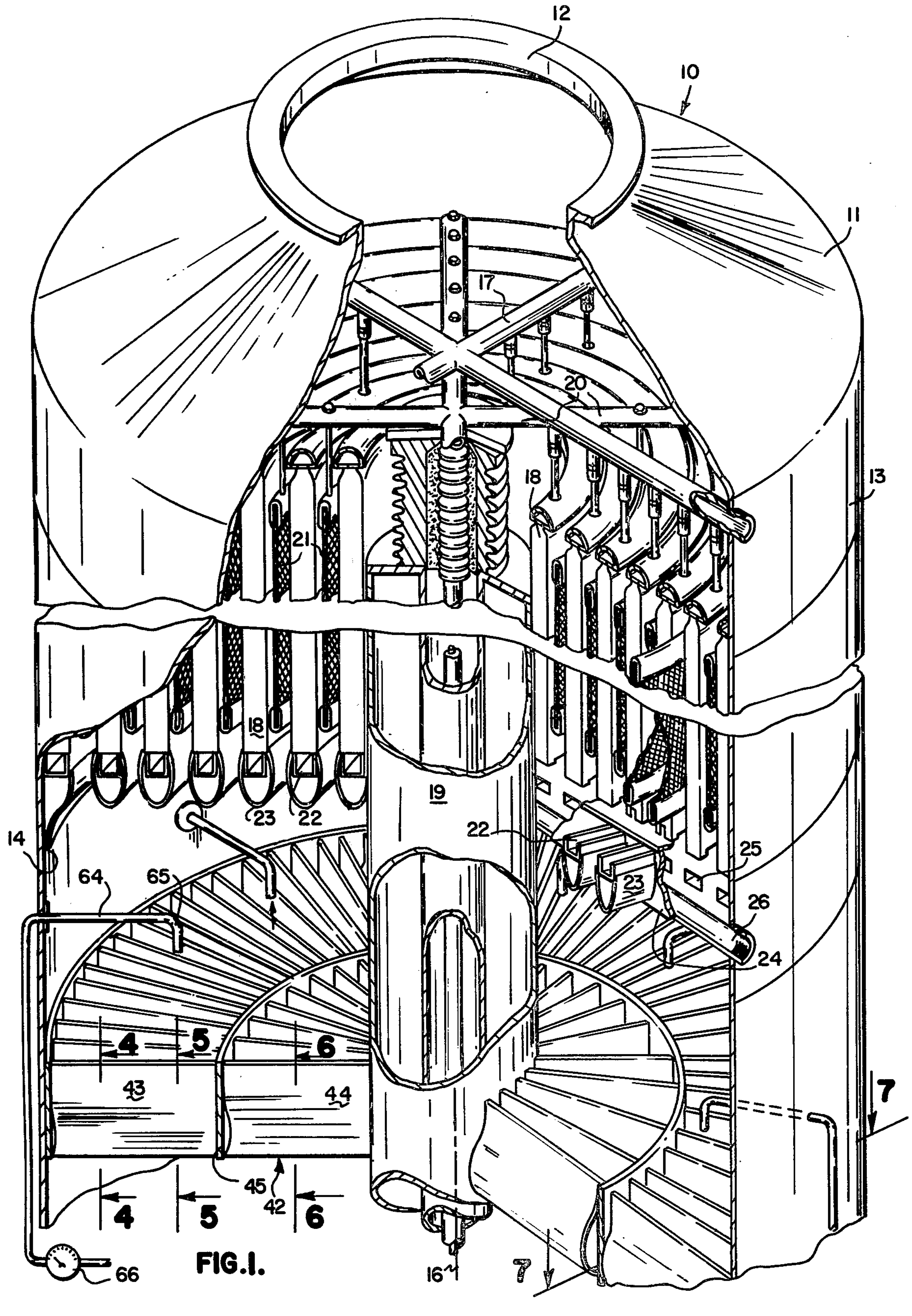
FIG. 1 is a perspective view of the upper portion of an electrostatic precipitator which includes a portion of the flow preconditioner of the present invention with portions broken away and shown in section to permit illustration of a portion of the interior of the precipitator.
Figure 2:
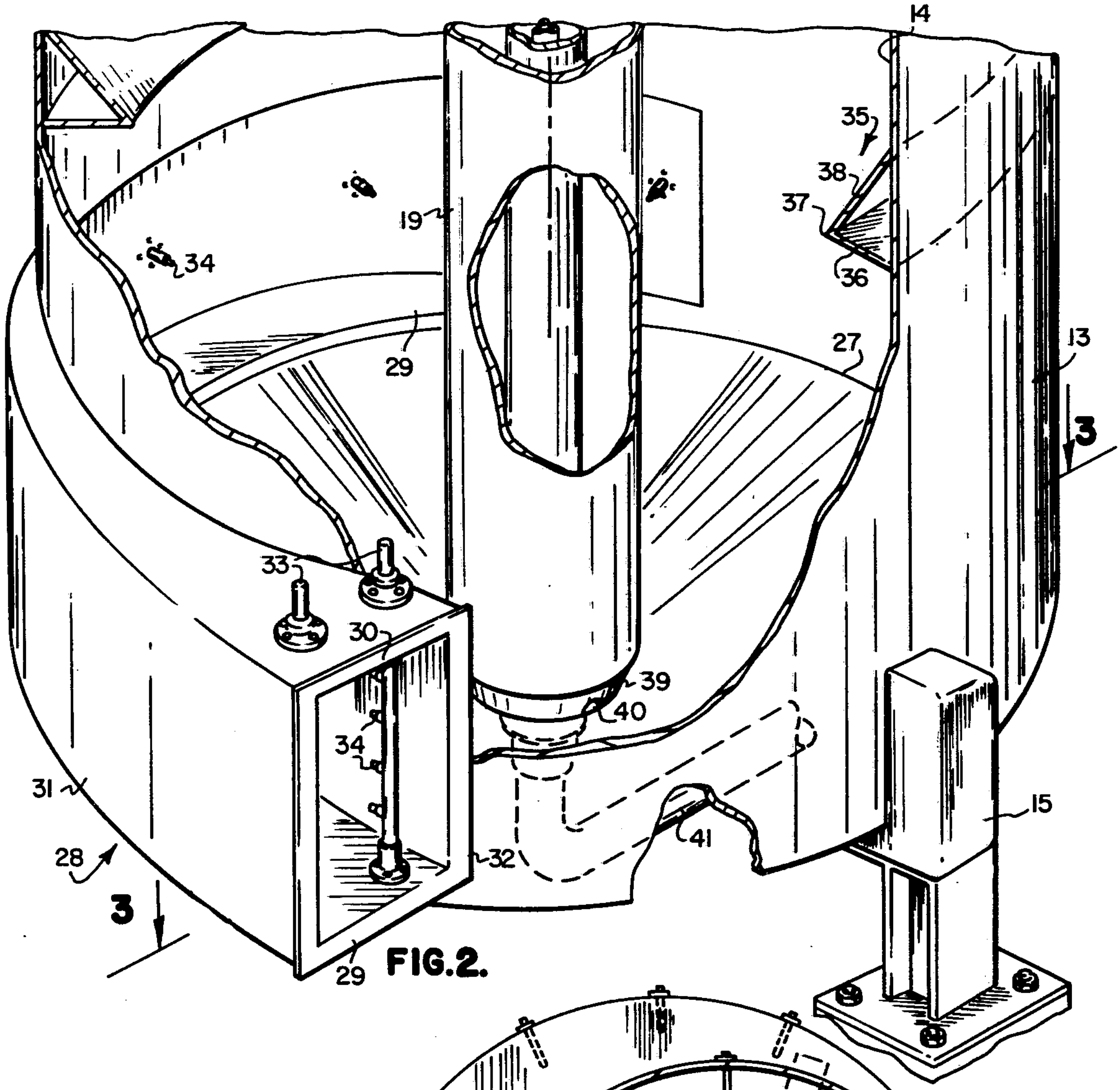
FIG. 2 is a perspective view similar to FIG. 1, depicting the lower end of the structure disclosed in FIG. 1, whereby FIG. 2 constitutes substantially a continuation of FIG. 1 with portions being broken away and illustrated in section.

A cylindrical housing is illustrated in FIGS. 1 and 2 and designated generally 10. It comprises an upper truncated conical top 11 having a central circular opening 12 constituting an outlet for gases from which pollutants have been removed. Depending from the periphery of top wall 11 is a cylindrical wall 13 which presents an inner surface 14. This cylindrical wall is continued downwardly as shown in FIG. 2 with its lower end being supported by a plurality of legs, one of which is shown at 15. The structure at the lower end of the housing 10 is not herein described at this point because it constitutes a material part of the present invention.

Referring now to FIG. 1, it is noted that cylindrical wall 13 has a central axis 16. Supported by cylindrical wall 13 immediately below top wall 11 is a spider providing cross-arms 17 from which a plurality of collector electrodes 18 are suspended. These collector electrodes 18 are cylindrical in structure and are equiradially spaced apart between cylindrical wall 13 and a central column 19. A second spider presents arms 20 from which are suspended a plurality of discharge electrodes 21. Each of the latter is spaced between an adjacent pair of collector electrodes 18.

At this point, it is deemed desirable to explain the structure at the right-hand side of FIG. 1 below the lower ends of the electrodes because this structure might at first glance appear to be a discrepancy between that shown at the left-hand side. It will be noted that each collector electrode 18 has a U-shaped trough 22 secured thereto at its lower end and a venturi 23 is also secured to the lower end of each collector electrode 18 and in at least some angular positions partially encloses a U-shaped trough 22.

The right-hand side of FIG. 1 is taken on a section that lies in a different plane from the left-hand side; thus, a radial supporting member, one wall of which is broken away and shown at 24, is hollow and both walls of which are formed with rectangularly shaped openings 25 which receive water from the U-shaped members 22. A discharge pipe 26 extends along the bottom of the radial supporting member and is formed with openings (not illustrated) which receive water and particles entrained therein from openings 25. It is recognized that this illustration at the right-hand side of FIG. 1 is somewhat indefinite and is the result of the draftsman who prepared the drawings exercising the license which has been accorded him over the years in illustrating structure which is not a part of the invention and is not herein claimed.

The Tangential Inlet

Referring now more particularly to FIG. 2, the bottom of housing 10 comprises a truncated bottom wall 27 the periphery of which is secured to cylindrical wall 13. A tangential inlet for contaminated gases is represented in its entirety at 28 and comprises a bottom wall 29, a top wall 30, an outer wall 31, and an inner wall 32. These walls define a rectangular opening which gradually diminishes in width as represented by the arcuate portion of lower wall 29, the inner edge of which merges in with the periphery of bottom wall 27 of the housing. Upper wall 30 of the inlet similarly reduces in width of the point where it merges in with cylindrical wall 13.

Extending between walls 29 and 30 are a pair of manifolds 33, each of which carries a plurality of spray heads 34. Outer inlet wall 31 also carries a plurality of spray heads 34.

Mounted on cylindrical wall 13 and extending inwardly therefrom is an annular ledge or choke ring designated generally 35. It comprises a flat lower wall 36 which is normal to axis 16 and which presents an outer edge 37. Integrally connected to wall 36 at edge 37 is a truncated conical wall 38 which extends radially outwardly and upwardly from edge 37 to inner surface 14 of wall 13.

Lower end of column 19 has a ring 39 secured thereto and this member 39 is formed with a plurality of ports, one of which is shown at 40, and which constitute outlets for water and particulate matter collected thereby which fall onto bottom wall 27 of the housing. A discharge tube is represented by broken lines at 41 and extends from ring 39 to an appropriate disposal point.

The operation of the mechanism disclosed in FIG. 2 is briefly summed up as follows: Polluted gas under pressure is introduced into the open end of inlet 28. Due to the tangential relation of the latter to cylindrical wall 13, this gas swirls around and creates a vortex. Water is sprayed onto the gas by spray heads 34 and picks up or entrains particulate matter in the gases. This matter and the water having some mass is thrown outwardly of bottom wall 27 and against cylindrical wall 13, whereupon it is moved upwardly under the pressure of the gas and strikes against the wall 36 of choke ring 35. This causes the water and the entrained particulte matter to fall downwardly onto conical bottom 27 and through ports 40 into discharge pipe 41.

Figure 3:
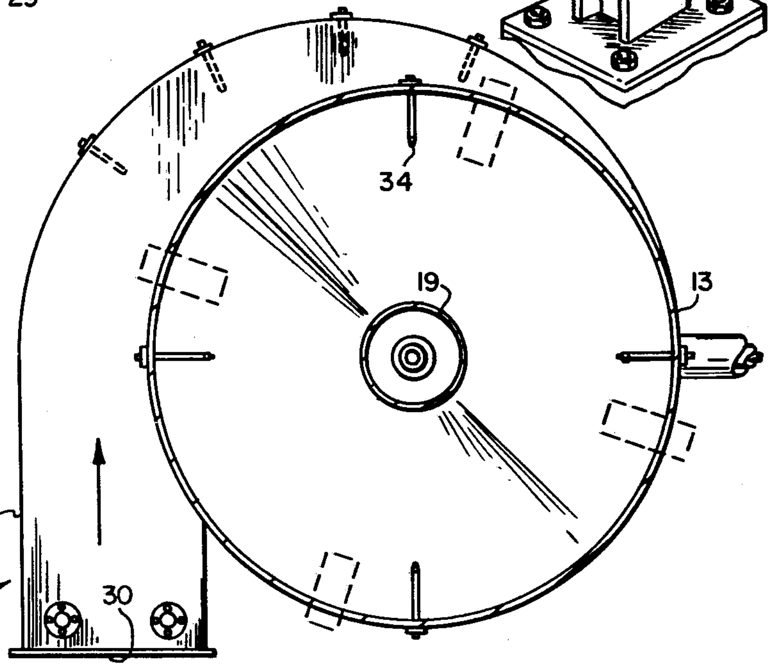
FIG. 3 is a horizontal cross-section through the lower end of the preconditioner, being taken about on the plane represented by the line 3—3 of FIG. 2.

The latter is illustrated in broken lines in FIG. 2 and is shown as passing through an opening 41*a* in conical wall 27 as shown in FIG. 3.

The Vane Assembly

Referring now more particularly to FIGS. 1 and 4–8, inclusive, a vane assembly is identified in its entirety by reference character 42. It comprises an outer array of vanes 43 and an inner array of vanes 44 which are separated by an annular partition 45, the latter being parallel to axis 16. The assembly of vanes considered in its entirety extends from the inner surface 14 of wall 13 to the outer surface of tubular column 19, and in a highly simplified embodiment of the invention, only a single array of such vanes would afford satisfactory results. However, to achieve the best results, two arrays are utilized and there are a lesser number of vanes 44 in the inner array as compared to the number of vanes 43 in the outer array. While the vanes 43 and 44 are of different lengths, they are identical in the structure now to be described. Thus, FIGS. 4, 5 and 6 depict a single vane 43. This vane 43 has a flow receiving edge 46 which faces, or is directed toward, the tangential inlet 28. The term "directed toward" as herein used means that the stream of gases impinges or flows onto this edge 46. Extending upwardly from edge 46 and in a direction away from the inlet 28 is a curved portion 47 and extending upwardly from curved portion 47 is a flat portion 48 that is parallel to the axis 16 of the housing. In the outer end portion of vane 43, as represented in FIG. 4, there is a flat portion 49 of small extent immediately contiguous to flow receiving edge 46. This flat portion 49, together with curved portion 47, defines a trough having a camber or depth represented by the line 50 in FIG. 4. This trough has a much smaller camber, as represented by the line 51 in FIG. 5, and a still smaller camber, represented by the line 52 of FIG. 6.

Inasmuch as vanes 43 and 44 are used to control the flow of a gas stream thereover, it is believed that terms used in aeronautical engineering are the best way of describing the characteristics of the troughs defined by the curved portions of the vanes. Thus, the length of a vane is ordinarily identified as its span, which would be the length of the edge 46. The distance between the upper and lower edges of the vane are commonly called its chord. Thus, the chord of each of the vanes 43 remains constant and the camber of the trough defined by curved portion 47 gradually decreases from the outer end of the vane along its span radially inward toward the axis 16.

Another way to describe the characteristics of vanes 43 is to relate the flat portion 49 adjacent flow receiving edge 46 to an imaginary plane 9 which is normal to axis 16. The angle between the lower face of flat portion 49 and plane 9 is identified as a in FIG. 4. In FIG. 5 the flat portion adjacent to edge 46 is materially reduced but its plane is represented by line 8 and the angle between line 8 and line 9 is represented by the angle b. In FIG. 6 the flat portion adjacent to edge 46 is further reduced but it is existent and its plane is represented by the line 7. The angle between the plane of line 7 and the plane of line 9 is represented by the angle c. Thus, angle a is an acute angle, as are angles b and c, but angle b is greater than angle a, and angle c is greater than angle b.

First Modification

While the choke ring 35 illustrated in FIG. 2 has proven to be satisfactory in many installations, it is believed that it is desirable to provide for further distribution of the gases after they pass the choke ring 35 and particularly towards the outer regions of the cylindrical housing below the vane assembly. Thus, referring now more particularly to FIGS. 9 and 10, a spoiler ring comprises a lower truncated conical portion 53 and an upper truncated conical portion 54 of a different pitch from the portion 53. Conical portion 53 extends below the edge 37 of choke ring 35 and partially overlaps wall 38 to provide an annular slot 55 which widens in the zone of the ring portion 54. Gases passing upwardly from the lower end of cylindrical housing 13 are directed through this slot 55 and thus to the radially outward regions of the housing 13 beneath the vane assembly.

Figure 10:
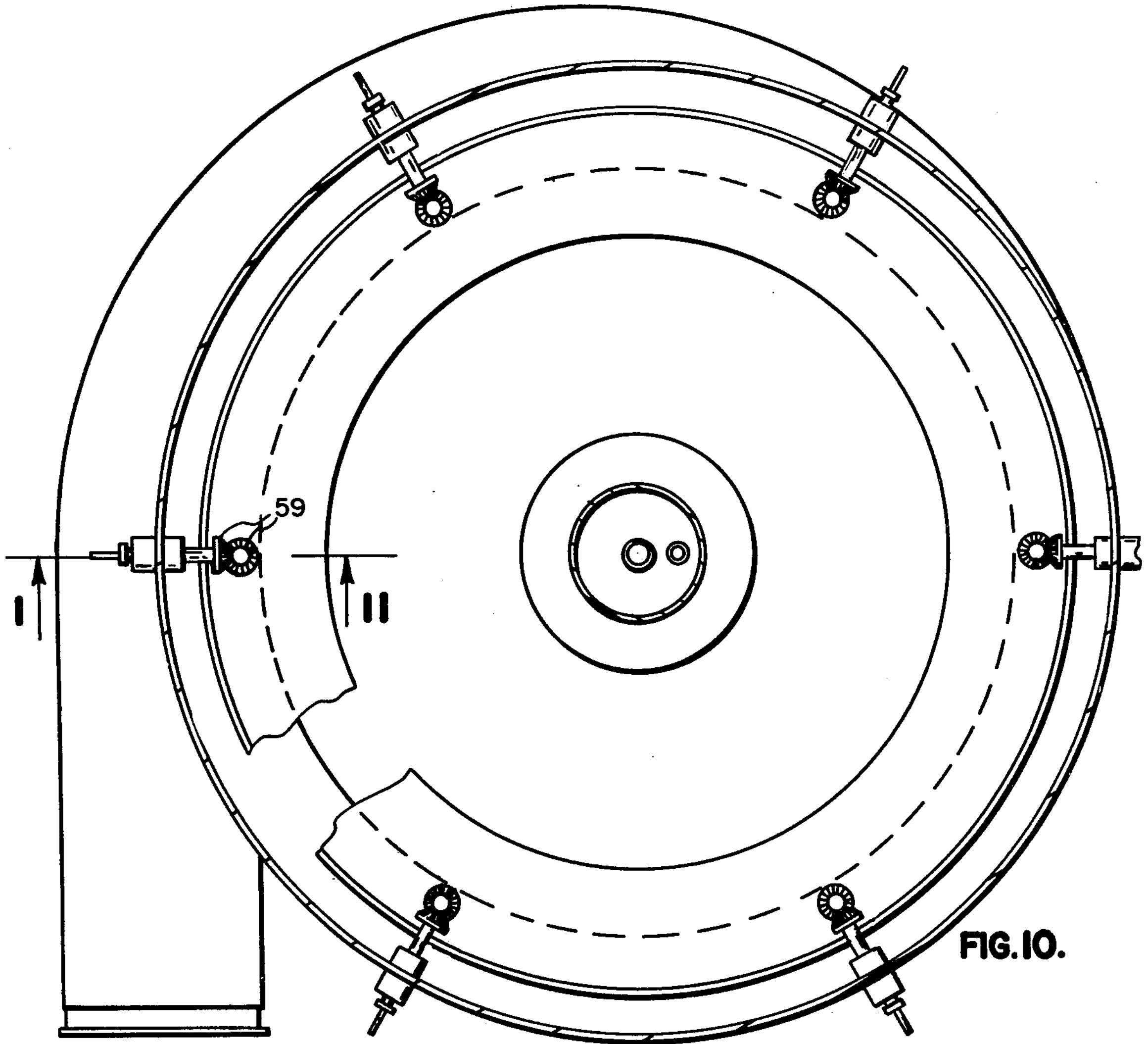
FIG. 10 is a horizontal section through the housing above the spoiler ring and associated mechanism, being taken about on the plane being represented by the line 10—10 of FIG. 9.
Figure 11:
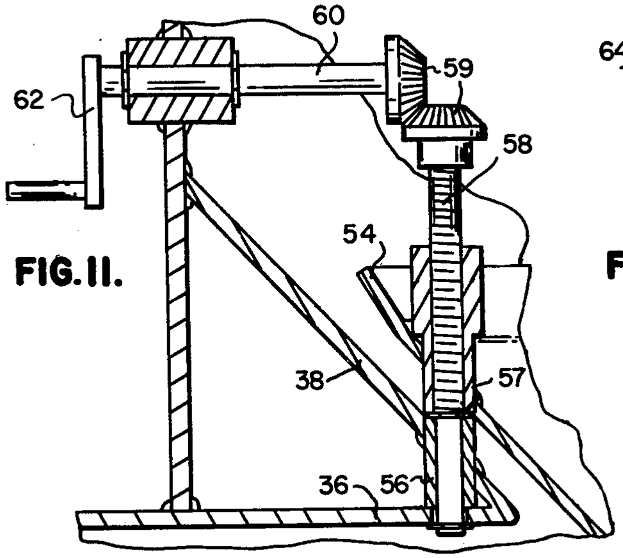
FIG. 11 is a detail on an enlarged scale illustrating the manually operable adjustment mechanism for the spoiler ring.

Provision is made for adjusting spoiler ring 53 relative to choke ring 35 by providing a sleeve 56 which is secured to bottom wall 36 and passes through wall 38. Another sleeve 57 is internally threaded and anchored to ring portion 54. A threaded shaft 58 is externally threaded and screwed into sleeve 57. Bevel gears 59 and crankshaft 60 are manually operable by handle 61. A plurality of these manually operable adjusting devices are equi-angularly spaced about the housing as illustrated in FIG. 10, one of them being shown in detail in FIG. 11. It is evident that by operating these devices, spoiler ring 53 may be adjusted relative to choke ring 35 to vary the width or depth of slot 55.

Referring now more particularly to FIG. 1, a plurality of pitot tubes 64 have downturned end portions 65 which extend down a slight distance into the spaces between the vanes 43. These pitot tubes 64 are angularly spaced apart and pass through openings 5 in cylindrical wall 13 and then downwardly to a gauge 66 to indicate the rate of flow through the main assembly and whether or not adjustment of the slot 55 is necessary.

Second Modification

Figures 9, 13:
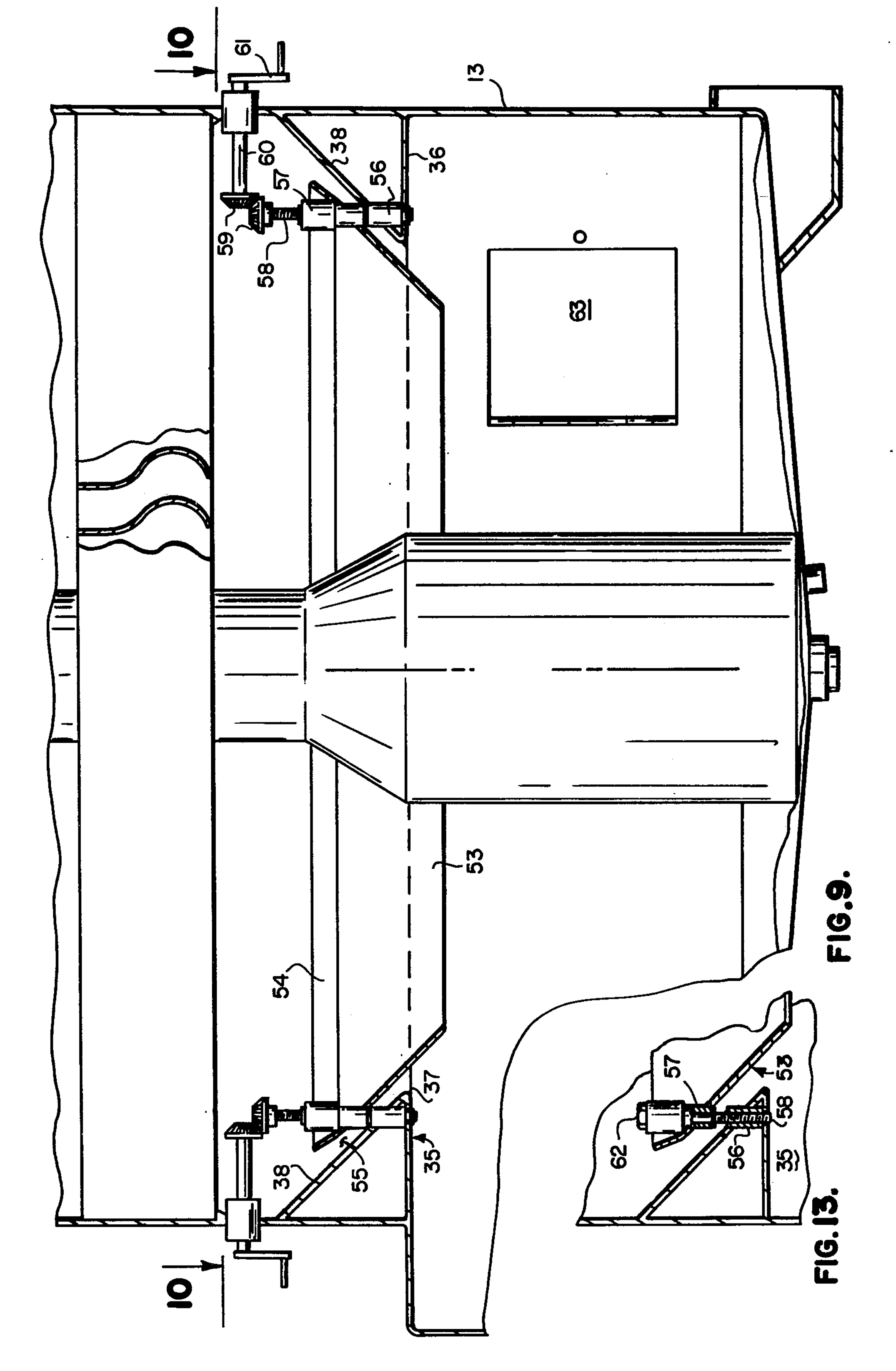
FIG. 9 is a detail on an enlarged scale through a modificaton including the spoiler ring and is taken as a fragmentary vertical section.
FIG. 13 is yet another modification depicting a different type of mechanism for achieving the manual adjustment of the spoiler ring.

A slightly different form of providing for this manual operation is depicted in FIG. 13. In this modification, the same sleeves 56 and 57, together with threaded shaft 58, are mounted on choke ring 35 and spoiler ring 53 in the manner above described in connection with FIGS. 9 and 10. However, in lieu of the bevel gears 59, crankshaft 60 and handle 61, the upper end of shaft 58 is formed with a non-circular end portion 62 which may be engaged by a wrench to rotate the shaft. Access to these sockets 62 is provided by door 63 formed in the lower portion of housing 10.

Third Modification

Figure 12:
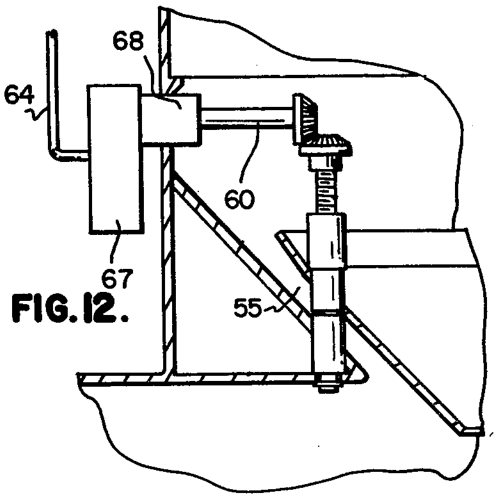
FIG. 12 is a view similar to FIG. 11 of a modification in which the spoiler ring is automatically adjusted.

Referring now more particularly to FIG. 12, mechanism for causing automatic adjustment of the slot 55 is therein illustrated. Thus, a transducer represented diagrammatically at 67 is connected to each pitot tube 64 and controls a motor 68 which is associated with and rotates each drive shaft 60. Thus, as the rate of flow of the gas stream as it emerges from the vane assembly varies, transducer 67 is effective to bring the motor 68 into operation to rotate drive shaft 60 and cause the necessary adjustment of slot 55.

While preferred specific embodiments of the invention are hereinbefore set forth, it is to be clearly understood that the invention is not to be limited to the exact mechanisms, constructions and devices illustrated and described because various modifications of these details may be provided in putting the invention into practice.

What is claimed is:

1. In an electrostatic precipitator including a housing having a cylindrical wall with a vertical axis and an outlet for purified gases at its upper end, a tangential inlet for polluted gases at the lower end of said cylindrical wall, a central tubular column coaxial with the axis of said cylindrical wall, a group of electrodes in the upper portion of said housing and comprising a plurality of cylindrical collector electrodes equi-radially spaced apart between said tubular column and said cylindrical wall, and a plurality of cylindrical discharge electrodes each of which is interposed between a pair of adjacent collector electrodes and spaced therefrom, the improvement comprising a flow preconditioner consisting of:

(a) an inverted truncated conical bottom wall attached to the lower end of said cylindrical housing wall with its lower end communicating with a discharge port in the lower end of said tubular column;

(b) a discharge pipe having an end connected to the lower end of said tubular column and passing through an opening in the lower end of said bottom wall;

(c) a plurality of spray heads angularly spaced apart in said tangential inlet;

(d) a choke ring in the form of an annular ledge mounted on said cylindrical wall and extending radially inwardly therefrom above said inlet; and (e) an assembly of equi-angularly spaced radial vanes above said choke ring and below said group of electrodes, said vanes being generally parallel to the axis of the cylindrical housing wall, each of said vanes having:

(i) a flow receiving edge facing said tangential inlet;

(ii) a curved portion extending upwardly from said flow receiving edge and away from said inlet; and (iii) a flat portion extending upwardly from said curved portion and parallel to the axis of said cylindrical housing wall;

said flow receiving edge and curved portion defining a trough having a camber which gradually and continuously decreases from the outer end of the vane along its span from said cylindrical wall to the tubular column with each vane having a chord that is constant throughout the span of the vane.

2. The flow preconditioner for electrostatic precipitator of claim 1 in which the vane assembly comprises an outer array of vanes and an inner array of vanes with a cylindrical partition between the two arrays and parallel to the axis of the cylindrical wall, there being a lesser number of vanes in the inner array than in the outer array.

3. The flow preconditioner for electrostatic precipitator of claim 1 in which said choke ring comprises a flat lower wall that is normal to the axis of the cylindrical wall and which presents an inner edge spaced from said cylindrical wall and an upper frustoconical wall extending from said inner edge to said cylindrical wall.

4. The flow preconditioner for electrostatic precipitator of claim 3 together with an inverted truncated conical spoiler ring which is adjustably mounted on said choke ring with portions of said spoiler ring and the frustoconical wall of the choke ring being in spaced overlapping relation to define an annular slot, and means for adjusting said spoiler ring relative to said choke ring to vary the width of said slot.

5. The flow preconditioner for electrostatic precipitator of claim 4 in which said spoiler ring is adjustably mounted on said choke ring by a plurality of angularly spaced sleeves secured to said choke ring adjacent its inner edge, an internally threaded sleeve secured to said spoiler ring in alignment with each of said first-mentioned sleeves and an externally threaded shaft screwed into each of said internally threaded sleeves, a crankshaft normal to each threaded shaft, and in whch the adjusting means comprises a pair of complemental bevel gears on the ends of each pair of shafts that are normal to each other and in meshing engagement, and a handle for each crankshaft.

6. The flow preconditioner for electrostatic precipitator of claim 4 in which said spoiler ring is adjustably mounted on said choke ring by a plurality of angularly spaced sleeves secured to said choke ring adjacent its inner edge, an internally threaded sleeve secured to said spoiler ring in alignment with each of said first-mentioned sleeves and an externally threaded shaft screwed into each of said internally threaded sleeves, and in which the adjusting means comprises a non-circular end portion formed on the upper end of each of said shafts for reception of a wrench, and a door in the lower end of said housing affording access to the end portions on said threaded shafts.

7. The flow preconditioner for electrostatic precipitator of claim 4 together with means for sensing the rate of flow of gases through said vane assembly, with the sensing means being disposed at the upper edges of said vanes.

8. The flow preconditioner for electrostatic precipitator of claim 7 in which the sensing means takes the form of a plurality of angularly spaced pitot tubes extending through openings in said cylindrical housing wall and having downturned end portions directed toward spaces between adjacent vanes with each pitot tube extending downwardly along the outer side of said cylindrical housing wall, and a pressure gauge operatively connected to each pitot tube.

9. The flow preconditioner for electrostatic precipitator of claim 7 in which the sensing means takes the form of a plurality of angularly spaced pitot tubes extending through openings in said cylindrical housing wall and having downturned end portions directed toward spaces between adjacent vanes with each pitot tube extending downwardly along the outer side of said cylindrical housing wall, a transducer operatively connected to each pitot tube, and an electric motor associated with each transducer and controlled thereby, said motor being operatively connected to the means for adjusting the spoiler ring relative to the choke ring.

10. The flow preconditioner for electrostatic precipitator of claim 1 in which said tangential inlet has an open end and is defined by top, bottom and side walls, with the top and bottom walls gradually decreasing in width from said open end to an area in which they blend in with said cylindrical housing wall.

* * * * *

UNITED STATES PATENT AND TRADEMARK OFFICE

CERTIFICATE OF CORRECTION

PATENT NO. : 4,181,509

DATED : January 1, 1980

INVENTOR(S) : HONACKER et al.

It is certified that error appears in the above-identified patent and that said Letters Patent are hereby corrected as shown below:

Column 1, line 12: Change "588,233" to -- 588,223 --.

Column 2, line 1: Change "tends" to -- intends --.

Column 2, line 26: Change "angular" to -- annular --.

Column 3, line 26: After "Thus" insert -- , --.

Column 9, line 40: Change "exterally" to -- externally --.

Column 9, line 41: After "," insert -- and in which the adjusting means comprises --.

Column 9, line 42: Delete "and in which the".

Column 9, line 43: Delete "adjusting means comprises".

Signed and Sealed this

*Sixth* Day of *May 1980*

[SEAL]

*Attest:*

SIDNEY A. DIAMOND

*Attesting Officer* *Commissioner of Patents and Trademarks*